Jan. 13, 1970      H. R. CRAVEN, JR., ET AL      3,489,315
       MULTIPLE PRICE SLANT SHELF DISPENSING MACHINE FOR
                      CYLINDRICAL ARTICLES
Filed Dec. 11, 1967                              5 Sheets-Sheet 1

INVENTORS
Herman R. Craven, Jr.
Karl D. Fastner

BY Schmidt, Johnson, Hovey,
   Williams & Bradley
                    ATTORNEYS

INVENTORS
Herman R. Craven, Jr
Karl D. Fastner

INVENTORS
Herman R. Craven, Jr.
Karl D. Fastner

INVENTORS
Herman R. Craven, Jr.
Karl D. Fastner

INVENTORS
Herman R. Craven, Jr.
Karl D. Fastner

United States Patent Office 3,489,315
Patented Jan. 13, 1970

3,489,315
MULTIPLE PRICE SLANT SHELF DISPENSING MACHINE FOR CYLINDRICAL ARTICLES
Herman R. Craven, Jr., Prairie Village, Kans., and Karl D. Fastner, Grandview, Mo., assignors to The Vendo Company, Kansas City, Mo., a corporation of Missouri
Filed Dec. 11, 1967, Ser. No. 689,645
Int. Cl. B65g 59/00; B65h 3/44
U.S. Cl. 221—125
18 Claims

ABSTRACT OF THE DISCLOSURE

A vending machine having a number of manually operable vending assemblies permits product selection by opening any one of a plurality of product access gates after coin deposit at least equivalent to product price. Common bar structure precludes sequential operation of the vending assemblies and captive link mechanism precludes simultaneous operation of two or more vending assemblies. Each assembly has product sensing means for blocking its operation when the product shelf associated therewith is exhausted or "sold out." Product divider means for each assembly blocks access to the next succeeding product on the storage shelf that is disposed to feed the products in turn to the vending station or product support for each assembly respectively. A pricing arrangement permits vending of items on different shelves for any one of three preselected prices within the range of the particular coin mechanism utilized.

---

One important object of the instant invention is to provide common bar structure and captive link mechanism for vending machines that are so interrelated as to be actuated and perform their respective functions during each vending operation by a novel lock carried by each vending assembly respectively and adapted to impart positive motion not only to the link mechanism but to the bar structure.

Another important object of our present invention is to provide a direct drive between each manually moved product access gate and the common bar such that initial displacement of the bar blocks opening of all other gates and continues to preclude opening of additional gates throughout the cycle of reciprocable travel of the bar.

Still another object of the present invention is to associate the captive link mechanism with the locks which reciprocate the common bar in a manner to prevent access to more than one item during a single vending operation, each lock operating to shift the common bar and the links at the same time so that no two or more gates can be opened in unison.

A further object of our instant invention is to provide ratchet means common to all assemblies which not only precludes downward movement of the common bar after it is released and its upward movement commences, but precludes upward movement of the bar once it starts its descent to a standby position, all for the purpose of preventing pilfering.

It is a very important object of the present invention to provide a machine of the slant-shelf class with means for pricing the products on different shelves at any one of several different prices, and with such means being operable during the small initial free movement of any product access gate to sense the presence of appropriate deposit in the coin mechanism.

And a still further very important object of the invention is the provision of means in combination with each vending assembly for sensing product exhaustion and for thereafter blocking operation of that vending assembly in order that the customer may not inadvertently purchase an empty space.

Figure 1:
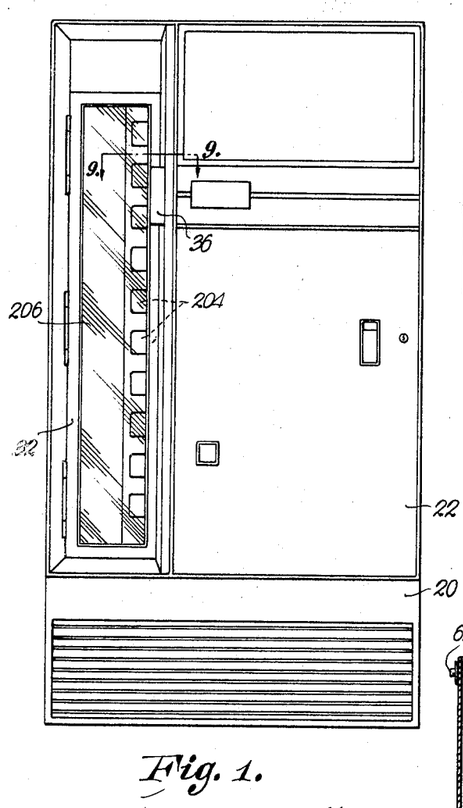
FIGURE 1 is a front view of the cabinet of the vending machine of the instant invention.
Figure 5:
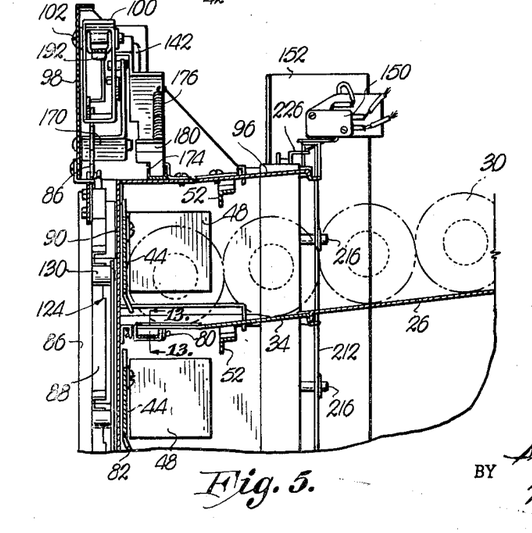
FIG. 5 is a cross-sectional view taken on line 5—5 of FIG. 4.
Figures 6, 7, 13, 15:
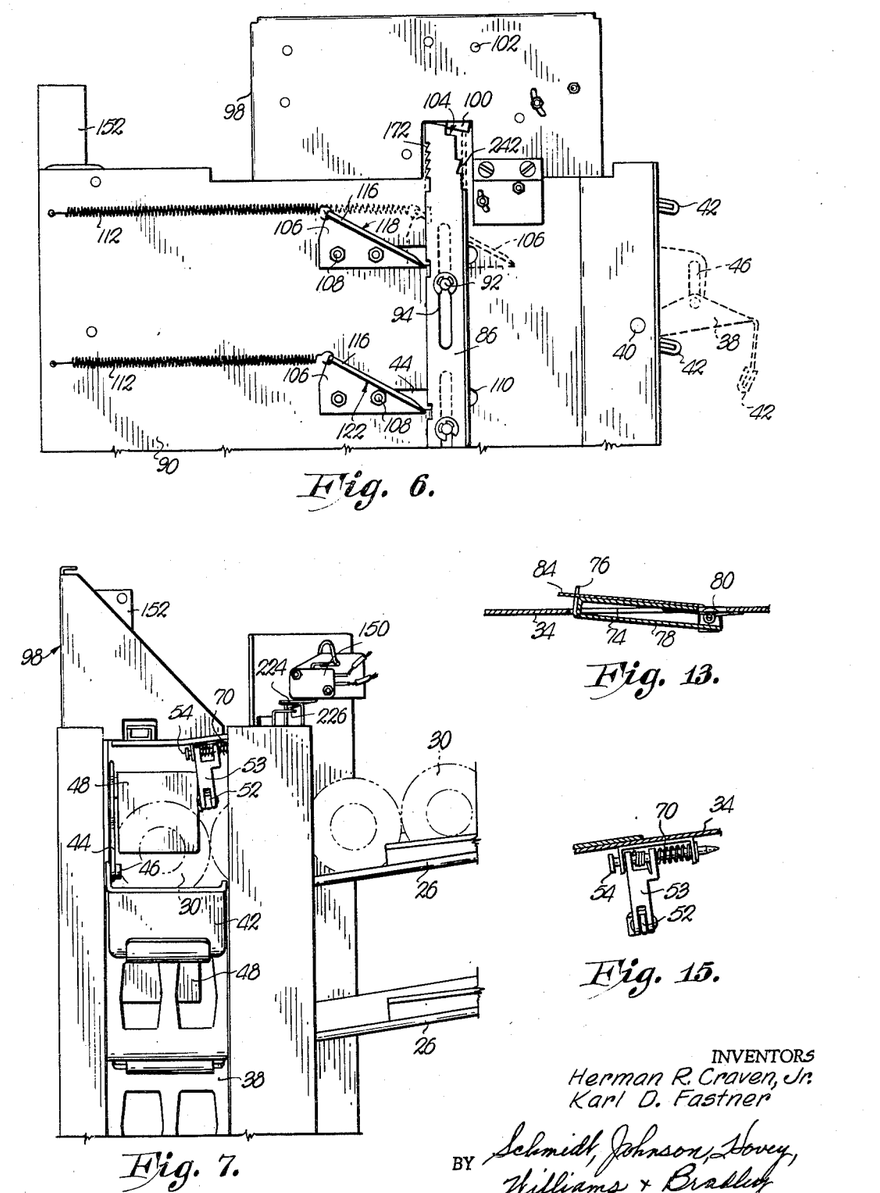
FIG. 6 is a view similar to FIG. 3 showing the opposite side of the unit.
FIG. 7 is a fragmentary front elevational view of the unit, with the upper gate open.
FIG. 13 is an enlarged, fragmentary, detailed, cross-sectional view taken along line 13—13 of FIG. 5.
FIG. 15 is a detailed view showing one end of the divider strip, as in FIG. 7, and in a direction opposite to FIG. 11.

Cabinet 20, shown in FIG. 1, has a normally locked door 22 closing product storage chamber 24 (FIG. 9) within which is provided a stack of shelves 26 (FIG. 4) that slope toward a compartment 28 (FIG. 9), as shown by FIGS. 5 and 7, for gravitational movement of products 30 (bottles, cans or similar containers) into compartment 28. The equipment illustrated in FIGS. 2–8 and 10–12 comprises a unitary arrangement of vending appliances removably housed in a compartment 28 behind customer-access door 32, and includes a number of superimposed stations, each adapted to recive a product 30 to be vended. Each such station includes a product support 34, one for each shelf 26 respectively (FIGS. 2–5 and 11).

VENDING ASSEMBLIES

Figure 3:
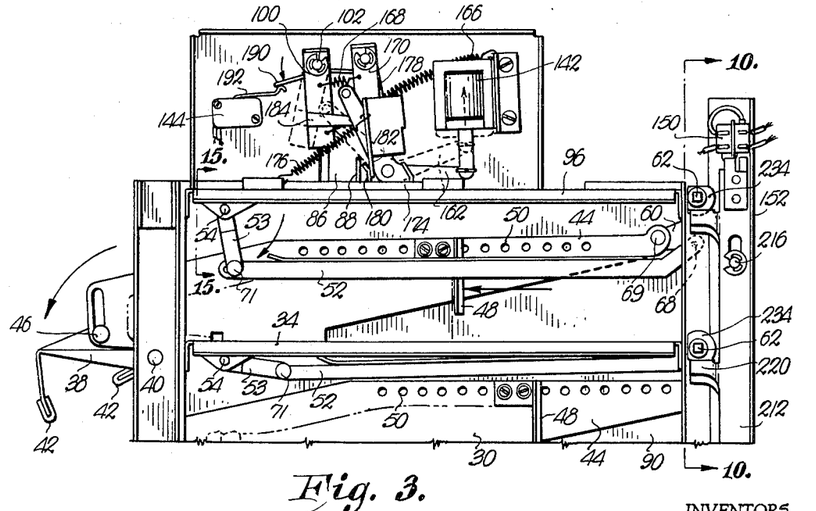
FIG. 3 is a view similar to FIG. 2 but showing the upper vending assembly with its access gate fully open.
Figure 4:
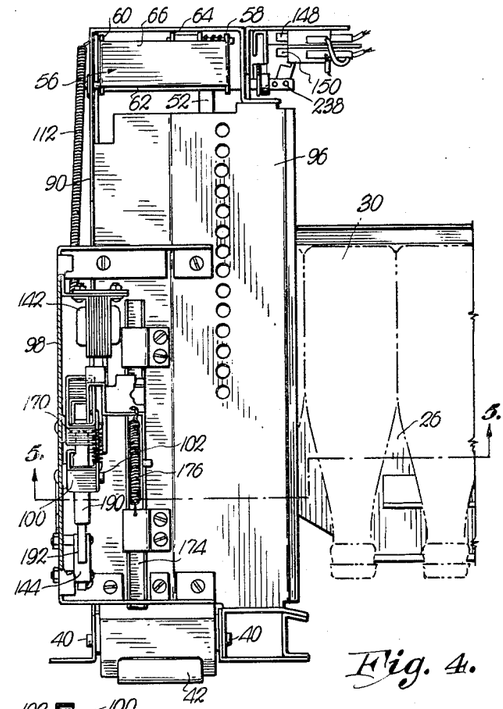
FIG. 4 is a plan view of the unit depicted in FIGS. 2 and 3, showing additionally, a portion of the uppermost product storage shelf.

Upon opening of door 32, by use of handle 36 (FIGS. 1 and 3), there is presented an upright (slightly inclined inwardly or rearwardly) gate 38 (FIG. 7) in front of each product 30 respectively (resting on their respective supports 34), adapted to be manually swung outwardly about horizontal hinge pins 40 to the horizontal position shown in FIGS. 3 and 6, with handles 42 of gates 38 hanging vertically. This also pulls an upright, plate-like part 44 outwardly, by virtue of pin-slot connection 46 with gate 38, to in turn shift the product 30 toward the customer by the action of pusher 48 on each part 44 respectively. A series of fastener-receiving holes 50 in part 44 permits adjustment of pushers 48 to accommodate products of varying lengths. Pushers 48 may be omitted if desired when products 30 are in the nature of bottles which have narrow necks that are more easily grasped and pulled from supports 34 than cans or the like.

PRODUCT DIVIDER

Figure 10:
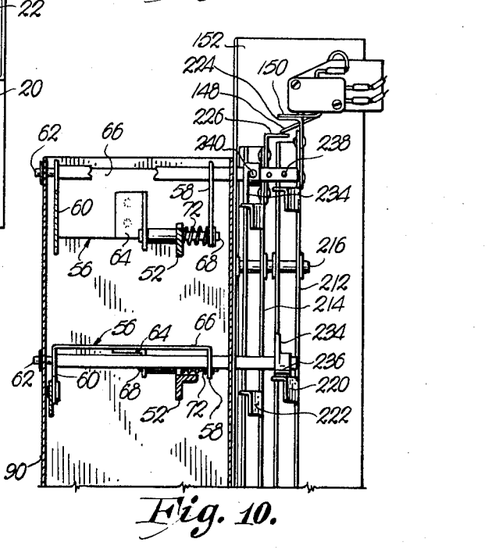
FIG. 10 is a fragmentary, cross-sectional view taken on line 10—10 of FIG. 3.

During each such outward movement of each gate 38, an elongated divider strip 52 (FIGS. 2, 3 and 5) moves to a position holding the products 30 on the corresponding shelf 26 against gravitation toward their supports 34, thereby precluding customer access to more than one product 30 during each vending operation. Parallel linkages maintain strips 52 horizontal and include a link 53 on pin 54 (carried by support 34) adjacent gate 38, as well as a unit 56 remote from gate 38. U-shaped unit 56, having legs 58 and 60, is fixed to a rotatable shaft 62 and has a bracket 64 on its bight 66 (FIG. 10). A pin 68 between leg 58 and bracket 64 receives the innermost end of strip 52, and the innermost end of the part 44 is connected to leg 60 by pivot 69. Pin 71 connects strip 52 with link 53 (FIG. 3).

Thus, forward movement of part 44 swings unit 56 to shift bight 66 from a horizontal to a vertical position as shown in FIG. 10, thereby moving strip 52 downwardly to the position shown in FIGS. 3, 7 and 10, barring gravitation of the product 30 which it engages as seen in FIG. 7, the product 30 to be vended being disposed between part 44 and strip 52.

Strip 52 is shiftable on pins 54 and 68, the latter being provided with springs 70 and 72 respectively (FIGS. 10 and 11) which yieldably bias the strips 52 toward the part 44, thereby accommodating the larger diameter products 30 on supports 34 without creating interference to the downward movement of strips 52.

SOLD-OUT SYSTEM

Figure 2:
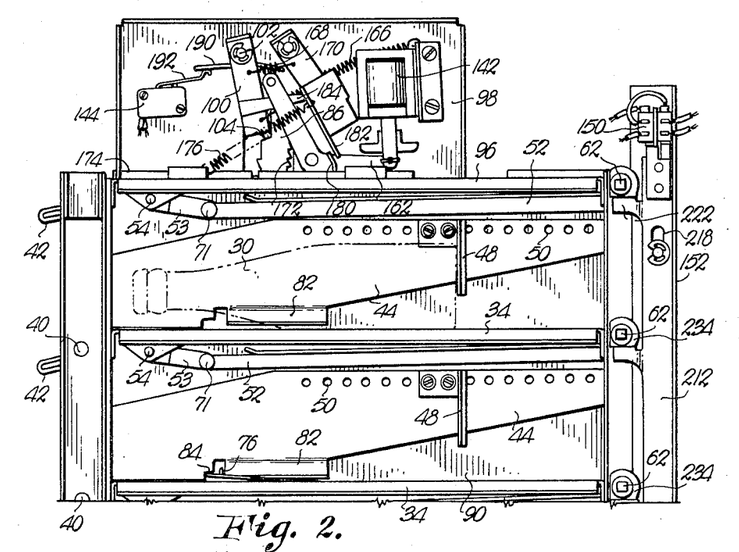
FIG. 2 is a fragmentary side elevational view showing the two uppermost vending asemblies, together with the control system thereabove.
Figure 11:
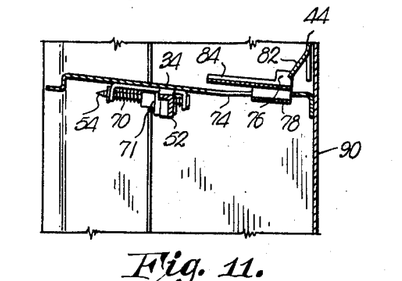
FIG. 11 is a fragmentary, cross-sectional view similar to FIG. 10 but looking in the opposite direction, and taken through one of the sold-out sensors.

Each support 34 has a cut-out 74 (FIGS. 11 and 13) which receives upstanding leg 76 of a sensor 78 that is swingable on pin 80 (FIG. 5) carried by support 34 therebeneath. A spring 81 on pin 80 yieldably biases sensor 78 upwardly to place leg 76 into the path of travel of an inclined wing 82 on part 44 (FIGS. 2 and 11). Products 30 on supports 34 rest on plates 84 (FIGS. 5 and 11) secured to sensors 78 to hold legs 76 out of the paths of travel of the wings 82.

During vending the lowermost edges of wings 82 hold sensors 78 down. When shelves 26 are exhausted of products 30, the corresponding vending assemblies cannot be operated because legs 76, serving as blocking means, preclude outward movement of parts 44.

COMMON BAR STRUCTURE

Figure 8:
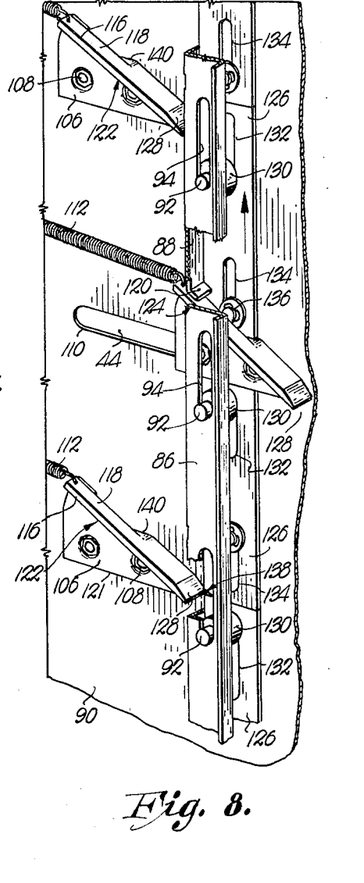
FIG. 8 is an enlarged, fragmentary, perspective view showing that side of the unit illustrated in FIG. 6.
Figure 9:
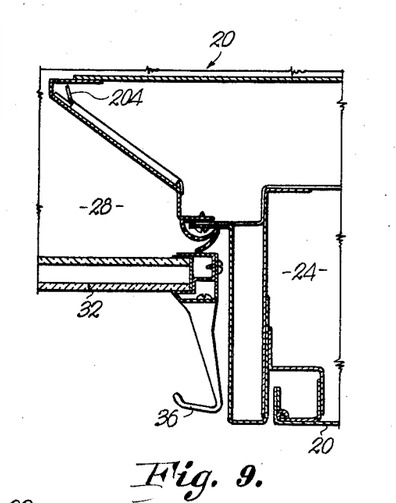
FIG. 9 is an enlarged, detailed, cross-sectional view taken on line 9—9 of FIG. 1.

Structure for precluding sequential operation of the vending assemblies includes a reciprocable device 86 (FIGS. 2, 3, 5, 6, 8 and 12) in the nature of a bar that is transversely Z-shaped (FIG. 12) presenting a leg or lateral extension 88 (FIGS. 5 and 8). Bar 86, common to the vending assemblies, is carried by a wall 90, on that side thereof opposite to parts 44, for recti-linear, up and down movement, through use of a vertical series of studs 92 passing through corresponding slots 94 in bar 86, which slots 94 serve as stop means to normally hold bar 86 against downward movement along its longitudinal axis.

Figure 12:
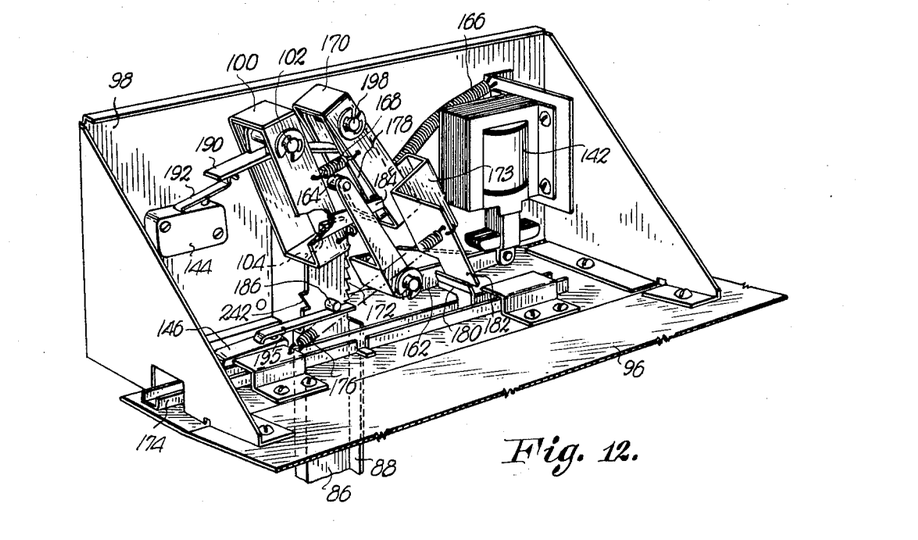
FIG. 12 is a perspective view of the control system shown at the top of FIGS. 2 and 3.

A top 96, spaced above the uppermost support 34, carries a bracket having an upstanding bight 98 offset from wall 90 (FIGS. 5 and 12). Releasable latch means 100, swingable on pin 102, carried by bight 98, is normally within the path of upward travel of bar 86, but spaced above shoulder 104 on bar 86 (FIG. 6) whereby to normally limit the extent of upward movement of bar 86. This permits slight outward movement of gates 38 but not enough to gain access to products 30.

Each vending assembly carries a reciprocable lock 106 in the nature of a wedge that is attached to part 44 by fasteners 108 which are cleared through horizontal slots 110 in wall 90. Locks 106 move toward and away from bar 86 and are yieldably biased away from bar 86 by springs 112. Leg 88 has a longitudinal series of openings 114 (FIGS. 5, 6 and 8) which receive inclined rails or flanges 116 of locks 106 during opening of gates 38. Upper cam surfaces 118 of locks 106 engage complementally inclined cam tab elements 120 (FIG. 8) on leg 88 that are turned inwardly at the top of each opening 114 respectively, thereby shifting bar 86 upwardly until shoulder 104 contacts latch 100, unless latch 100 is released to permit bar 86 to rise farther. Bottom cam surfaces 122, parallel with surfaces 118, engage bar 86 at the bottoms 124 (FIG. 5) of openings 114, as gates 38 are returned to their normal upright positions, to withdraw locks 106 from tabs 120, thereby driving the bar 86 downwardly toward the lowermost end of its path of travel. When one lock 106 shifts bar 86 upwardly, the remaining openings 114 move out of alignment with their locks 106, causing the leg 88 to serve as means blocking movement of the remaining locks 106.

CAPTIVE LINK MECHANISM

Mechanism for precluding simultaneous operation of two or more vending assemblies upon release of latch means 100 includes a series of elongated, normally engaged, vertically movable, link members 126 stacked between wall 90 and bar 86 within the paths of travel of ramps 128 of surfaces 118. Spacers 130 (FIGS. 5 and 8) are provided on studs 92 between bar 86 and links 126, and a pair of slots 132 and 134 in each link 126 receive studs 92 and pins 136 respectively, both of which are mounted on wall 90. Slots 132 normally engage studs 92, presenting stop means which hold links 126 against downward movement.

The abutting ends of links 126 are aligned with and parallel to the leading edges of ramps 128 and the lower ends of links 126 have edges 138 (FIG. 8) that are inclined complementally with the angle of ramp 128. That part of cam surfaces 118 which engages the lower ends of links 126 is shorter than that portion of surfaces 118 which engages tabs 120, terminating in horizontal ledges 140 which slide beneath the links 126. Space requirements are thus reduced by limiting the extent of upward movement of links 126 to a distance less than the amount of upward travel of bar 86.

CONTROL SYSTEMS

Figure 14:
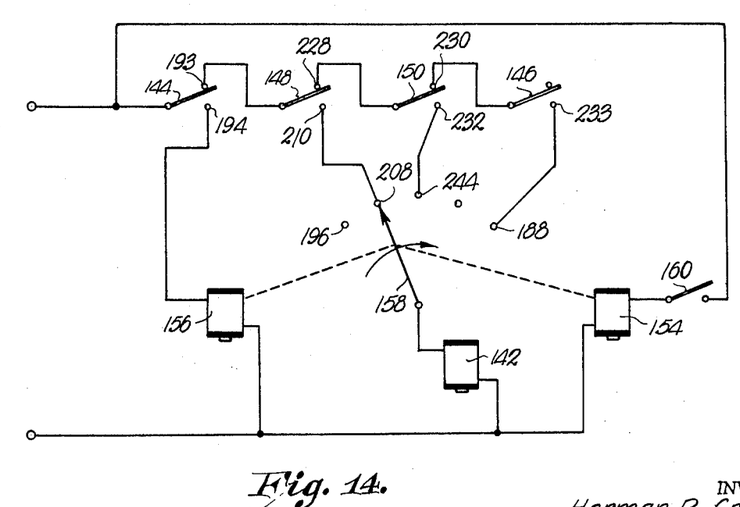
FIG. 14 is a wiring diagram of certain electrical components.

Referring primarily to FIGS. 12 and 14, a sweep arm 158 is adapted to engage a series of contacts 196, 208, 244 and 188, stepping coil 154 causing arm 158 to be advanced and reset coil 156 operating to return arm 158 to its standby position engaging contact 196. A coin switch 160 is shown in series with coil 154, and a solenoid 142 on bight 98 (FIG. 12) is shown in series with the arm 158.

Reset switch 144 and price switches 146, 148 and 150 are normally connected in series from one side of the line. The arms of switches 146, 148 and 150 are adapted when actuated to engage contacts 233, 210 and 232 respectively, which are in turn connected in series with contacts 188, 208 and 244 respectively. Switch arm 144 when actuated engages contact 194 which is in series with reset coil 156.

Switch 144 is mounted on bight 98 and has a leaf spring actuator 192; switch 146 is mounted on top 96 and has a leaf spring actuator 195 (FIG. 12). Switches 148 and 150 are mounted on one leg of an L-shaped upright 152 (FIGS. 2–5, 7 and 10).

As best seen in FIG. 12, solenoid 142 is pivotally coupled with a crank 162 that is swingable on bight 98 and provided with a projection 164 adapted to engage latch 100. A spring 166 connected with latch 100 yieldably biases the lower end wall of latch 100 (having the form of a rectangular loop) against one edge of bar 86, in obstructing relation to shoulder 104 of the latter to limit its free upward movement. A shorter spring 168 connects latch 100 with an outer ratchet 170; an inner ratchet 178 (having the same form as latch 100 and ratchet 170) is swingable on bight 98 by a pivot 198 that is common to ratchet 170. The lower end walls of ratchets 170 and 178 are adapted to engage the opposite edge of bar 86, particularly teeth 172 of the latter. A loop 173 rigid to ratchet 178 is provided with an outer wing 182 having a spring 176 attached thereto which yieldably biases the bight of loop 173 of ratchet 178 against bar 86 whenever door 32 is open.

A plunger 174, reciprocable on top 96, is disposed to be extended by spring 176 when door 32 is open and to be moved to the position shown in FIG. 12 when door 32 is closed in order to disengage ratchet 178 from bar 86. Wings 180 and 182 on plunger 174 and loop 173 respectively are in interengagement.

An L-shaped arm 184 rigid to latch 100 normally engages ratchet 170, and a pin 186 on bar 86 normally engages switch actuator 195. An arm 190, freely swingable on pin 102 is engageable with switch actuator 192 at one end thereof and by the upper end of bar 86 at the opposite end of arm 190.

The products 30 may all be sold at the same price or at different prices. For example, through use of cards 204 behind transparent window 206 of door 32 (FIG. 1) one or more shelves 26 may be designated one price, such as 10¢, another group of one or more shelves 26 at 15¢ and still another group of one or more shelves at a selling price of 25¢.

To this end (FIGS. 2–5, 7 and 10) a pair of pricing bars 212 and 214 (which may be channel-shaped as shown) are mounted on one leg of upright 152 for vertical reciprocation through use of slots 218 receiving pins 216. Spaced fingers 220 and 222 are provided on channels 212 and 214 respectively. Ears 224 and 226 are provided on the upper ends of channels 212 and 214 respectively, the ear 224 being adapted to move switch 150 into engagement with contact 232 and the ear 226 being adapted to move switch 148 into engagement with contact 210.

Each shaft 62 has a cam disc 234 mounted thereon for rotation therewith. The hubs 236 of discs 234 are slidable along their shafts 62 upon removal of a cross pin 240 which passes through hubs 236 and through a selected opening 238 in shaft 62. There is a finger 220 and a finger 222 beneath each shaft 62 respectively. When pin 240 is in the inner opening 238, disc 234 engages finger 222; when pin 240 is in the outer opening 238, disc 234 engages finger 220; and when pin 240 is in the center opening 238, disc 234 rotates freely between fingers 220 and 222.

OPERATION

Manifestly, the machine will include conventional coin handling means, such as coin deposit chutes, coin deposit responsive switches, escrow and totalizing equipment, coin credit and change return mechanisms, and other optional assemblies. Disclosure of such well-known arrangements has, therefore, been omitted, except for the simplified schematic layout of FIG. 14.

All of the parts shown in FIGS. 1, 2, 4, 5, 6, 9 and 11–13 are illustrated in a standby condition as they appear prior to opening of door 32. FIGS. 3, 7 and 10 show the position of the components when the upper gate 38 is fully open prior to reclosing of door 32. Dotted lines in FIG. 3 show the solenoid 142 energized along with corresponding positions of crank 162, latch 100, and ratchet 170 which represents the condition of these parts during opening of the gate. FIG. 8 shows the position of the parts when an intermediate gate 38 is fully open, and FIG. 14 shows the position of the components after deposit of the correct purchase price (for example, 10¢, to be indicated on the uppermost card 204) for a product on the upper support 34 prior to actuation of upper gate 38. In its simplest form, deposit of a dime closes switch 160 momentarily to pulse coil 154, causing the arm 158 to step from standby contact 196 to contact 208.

As long as arm 158 remains on contact 196, slight outward manual movement of gates 38 shifts bar 86 into engagement of its shoulder 104 with the lower end wall of latch 100. Thus no product 30 will be rendered accessible because gates 38 will not move beyond vertical.

However, when arm 158 is in the position shown in FIG. 14, the initial outward pull on upper gate 38 will cause the upper cam 234 to operate switch 148 and energize solenoid 142 through switch arm 144, contact 193, switch arm 148, contacts 210 and 208 and arm 158. Channels 212 and 214 are spring loaded upwardly; therefore, at standby they hold switch arms 150 and 148 against contacts 228 and 230. Since channel 214 is shifted down in FIG. 10 by the upper cam 234 bearing against the upper finger 222, switch arm 148 is moved against contact 210, and held there until gate 38 is returned to the fully closed position. However, solenoid 142 remains energized only until switch arm 144 is moved away from contact 193 by arm 190.

Energization of solenoid 142 causes crank 162 to swing latch 100, through projection 164 to the position clearing shoulder 104 as shown by dotted lines in FIG. 3. Since door 32 is open, spring 176 will have caused plunger 174 to be extended due to the engagement of wings 180 and 182 and caused ratchet 178 to move against bar 86. And spring 168 will move ratchet 170 against bar 86 in response to swinging of latch 100 away from shoulder 104.

The customer may now open the upper gate 38 to the position shown in FIG. 3. This imparts a pulling action on plate 44, causing pusher 48 to eject a product 30 from the upper support 34 to a position where it may be readily grasped and removed by the customer. If there is no product on the support 34, sold-out plate 84 will be in the position shown in FIG. 11 where leg 76 blocks wing 82. He then must select another article or press a coin return button or the like, not shown.

As plate 44 moves outwardly it swings unit 56 from the horizontal to the vertical position of its bight 66 (FIG. 10) through pin 68 (FIG. 3) and leg 60 (FIG. 10) to swing leg 58 and link 53, thereby lowering divider 44, the latter sliding along the surface of the next article 30 on product support 34, as seen in FIG. 7, if the article has one of the larger diameters of those which can be accommodated.

Outward movement of plate 44 also shifts the upper lock 106 through fasteners 108 to the dotted line position shown in FIG. 6. Upper ramp 128 enters its opening 114 and engages uppermost element 120 to raise bar 86. Cam surface 122 engages the upper end of the upper link 126 to hold all of the links 126 against upward movement as cam surface 118 continues to raise bar 86.

Effort to open another gate 38 after bar 86 commences to rise is prevented because all remaining openings 114 will have moved out of alignment with their locks 106. Moreover, it is not possible to simultaneously open two gates since each lock 106, as it enters the aligned mouth presented by edge 138 (FIG. 8), blocks movement of all the links 126 therebelow.

When any gate 38 except the topmost is opened (FIG. 8), its corresponding ramp 128 engages inclined edge 138 of the abutting link 126, raising all links 126 thereabove. When ledge 140 reaches the link 126 being shifted by surface 118, ledge 140 will merely slide horizontally beneath the lower end of such link and ascent of the latter will cease as cam surface 118 continues to raise bar 86. The surface 118 of the upper lock 106 performs the function only of raising bar 86, although under-surface 121 of the lock blocks movement of links 126 therebelow as usual. Ledge 140 of the upper lock 106 is, of course, not used.

Ratchets 170 and 178 engage teeth 172 alternately on the up-stroke of bar 86, precluding downward movement of bar 86 prior to reaching the upper end of its path of travel. The double ratchet means 170, 178 prevents reversal of movement of bar 86 and hence also reversal of movement of divider strip 52 to the same extent as could be accomplished with finer teeth 172 but premits the parts to be larger and more rugged, thus decreasing the possibility of breakage by forces applied to gates 38, especially by those who desire to pilfer the machine. It will be understood that after a gate 38 is open sufficiently to extract an article of the smallest diameter which can be accommodated, it must not be possible to reverse the upstroke of bar 86 and hence reverse the downstroke of divider strip 52 to an extent which would permit the article to pass beneath the strip.

When gate 38 is fully open the upper end of bar 86 engages arm 190 and it tilts the latter against actuator 192 to move switch arm 144 away from contact 193 into engagement with contact 194. This energizes coil 156 to reset arm 158 to the contact 196 and de-energizes solenoid 142, shifting crank 162, causing spring 166 to swing latch 100 into engagement with bar 86 and causing arm 184 to push ratchet 170 away from bar 86, as illustrated in FIG. 3, However, bar 86 does not descend because ratchet 178 is still engaging the downwardly facing teeth 172. Gate 38 remains fully open until door 32 is closed to depress plunger 174 and release ratchet 178 through the engagement of wings 180 and 182 against the action of spring 176.

If the customer should depress plunger 174 while the door 32 is open and at the same time hold gate 38 open, he might attempt to rock the open gate 38 sufficiently to raise strip 52 enough to gain access to the next succeeding product 30. However, when latch 100 engages bar 86 below shoulder 104 it is then in the path of upwardly inclined teeth 242, preventing such rocking of the open gate 38.

Closing of gate 38 raises the divider 52, permitting the next product 30 to gravitate to support 34. Bar 86 falls and latch 100 is moved above shoulder 104 by spring 166. Switch arm 144 returns to contact 193, switch arm 146 is opened by pin 186, cam 234 releases channel 214, and switch arm 148 returns to contact 228.

If, for example, a 15¢ item is to be purchased, the arm 158 is stepped to contact 244. In that event the cam 234 associated with the 15¢ product on the corresponding support 34 will shift the finger 220 of channel 212 to move switch arm 150 from contact 230 to contact 232. Solenoid 142 will be energized through switches 144, 148 and 150.

If, for example, a 25¢ product is to be purchased, arm 158 will be stepped to contact 188. The corresponding cam 234 will be disposed between fingers 220 and 222 and switches 148 and 150 will remain in the position shown in FIG. 14. Raising of bar 86 against latch 100 will close switch 146, because of pin 186 moving upwardly, and solenoid 142 will be energized through switches 144, 148, 150 and 146.

It will be apparent that switch 146, which is always operated as bar 86 is raised, permits articles of any or all vending assemblies to be sold for the highest of the three possible prices when respective cams 234 are set at the center openings on shaft 62 and that switch 146 performs no function with respect to any vending assembly which has its respective cam located in either of the adjacent openings controlling the two lower prices.

From the foregoing it will be understood there is presented a selective vending machine of the slant-shelf class for a variety of differing types and sizes of cylindrical products, capable of pricing each selection at any one of a plurality of prices, which includes also: means for retaining any product access gate, once opened, in open position until the overlying area door is released in order to facilitate single-handed operation of the machine, means for preventing inadvertent opening of any vending assembly which has been emptied of products which would cause loss of deposit and which machine has inherent safety characteristics which virtually preclude all types of pilfering.

Having thus described the invention, what is claimed as new and desired to be secured by Letters Patent is:

1. In a vending machine having a plurality of vending assemblies, each controlling a vending operation, and each carrying a rectilinearly reciprocable lock, structure for precluding sequential operation of said assemblies, said structure comprising a reciprocable device having:
   releasable latch means normally limiting the extent of movement of the device in one direction;
   stop means normally holding the device against movement in the opposite direction;
   an element within the path of travel of and slidably engageable by each lock respectively for gradually and uniformly shifting the device in said one direction upon release of said latch means; and
   blocking means for preventing movement of all remaining locks when one of the locks shifts the device in said one direction, each lock extending across the device beyond said element and being overlapped by said device when the latter is shifted thereby,
   said device comprising an elongated bar, common to the locks, mounted for rectilinear reciprocation along its longitudinal axis, and provided with a longitudinal series of openings, normally aligned with corresponding locks,
   each lock comprising a wedge engageable with the bar in a corresponding opening when shifting the bar in said one direction of movement of the bar,
   each wedge having a cam surface inclined with respect to the paths of travel of the bar and of the wedges,
   each of said elements comprising a cam tab on the bar adjacent each opening respectively,
   each cam tab being inclined complementally with the angle of inclination of the cam surface of the corresponding wedge,
   each wedge having a second cam surface, parallel to the first mentioned cam surface, and engageable with the bar in said corresponding opening during withdrawal therefrom for driving the bar in the opposite direction to said one direction in the event of abnormal frictional opposition to movement of the bar in said opposite direction.

2. In a vending machine having a plurality of vending assemblies, each controlling a vending operation, and each carrying a rectilinearly reciprocable lock, structure for precluding sequential operation of said assemblies, said structure comprising a reciprocable device having:
   releasable latch means normally limiting the extent of movement of the device in one direction;
   stop means normally holding the device against movement in the opposite direction;
   an element within the path of travel of and slidably engageable by each lock respectively for gradually and uniformly shifting the device in said one direction upon release of said latch means;
   blocking means for preventing movement of all remaining locks when one of the locks shifts the device in said one direction, each lock extending across the device beyond said element and being overlapped by said device when the latter is shifted thereby; and
   mechanism for precluding simultaneous operation of two or more of said assemblies upon release of said latch means,
   said mechanism including a series of normally engaged members, movable in one direction, and having stop means normally holding the same against movement in the opposite direction,
   said members engaging in the path of continued rectilinear movement of corresponding locks whereby each lock slides between a pair of members as the same slides along the element to displace all members on one side thereof in said one direction of movement of the members, and to block the remaining members against movement in said last mentioned direction.

3. The invention of claim 2,
each lock comprising a wedge having an inclined cam surface for displacing the members and shifting the device,
each wedge being provided with a member-engaging ledge, angularly offset from and trailing a portion of said surface,
said ledges being disposed to limit displacement of the members to an amount less than the displacement of the device.

4. The invention of claim 2,
each lock comprising a wedge having an inclined cam surface for displacing the members and shifting the device,
said members having ends normally in abutment and parallel to the paths of travel of the wedges,
one end of each member having an edge; inclined relative to said path of travel of the wedges, and disposed for engagement by the corresponding cam surface,
the inclination of said edges being complemental with the angle of inclination of the cam surface of the corresponding wedge.

5. In a vending machine having a plurality of vending assemblies, each controlling a vending operation, and each carrying a rectilinearly reciprocable lock, structure for precluding sequential operation of said assemblies, said structure comprising a reciprocable device having:
  releasable latch means normally limiting the extent of movement of the device in one direction;
  stop means normally holding the device against movement in the opposite direction;
  an element within the path of travel of and slidably engageable by each lock respectively for gradually and uniformly shifting the device in said one direction upon release of said latch means; and
  blocking means for preventing movement of all remaining locks when one of the locks shifts the device in said one direction, each lock extending across the device beyond said element and being overlapped by said device when the latter is shifted thereby,
  said device comprising an elongated bar, common to the locks, mounted for rectilinear reciprocation along its longitudinal axis, and provided with a longitudinal series of openings, normally aligned with corresponding locks,
  each lock comprising a wedge engageable with the bar in a corresponding opening when shifting the bar in said one direction of movement of the bar,
  each wedge having a cam surface inclined with respect to the paths of travel of the bar and of the wedges,
  each of said elements comprising a cam tab on the bar adjacent each opening respectively,
  each cam tab being inclined complementally with the angle of inclination of the cam surface of the corresponding wedge,
  said blocking means comprising a lateral extension on the bar within the path of travel of all remaining locks when one of the locks shifts the bar in said one direction of movement of the bar,
  said openings being in the extension,
  said tabs being integral with the extension.

6. In a vending machine having a plurality of vending assemblies, each controlling a vending operation, and each carrying a rectilinearly reciprocable lock, structure for precluding sequential operation of said assemblies, said structure comprising a reciprocable device having:
  releasable latch means normally limiting the extent of movement of the device in one direction;
  stop means normally holding the device against movement in the opposite direction;
  an element within the path of travel of and slidably engageable by each lock respectively for gradually and uniformly shifting the device in said one direction upon release of said latch means;
  blocking means for preventing movement of all remaining locks when one of the locks shifts the device in said one direction, each lock extending across the device beyond said element and being overlapped by said device when the latter is shifted thereby; and
  mechanism for precluding simultaneous operation of two or more of said assemblies upon release of said latch means,
  said mechanism including a series of normally engaged members, movable in one direction, and having stop means normally holding the same against movement in the opposite direction,
  said members engaging in the path of movement of corresponding locks whereby each lock moves between a pair of members upon operation of its assembly to displace all members on one side thereof in said one direction of movement of the members, and to block the remaining members against movement in said last mentioned direction,
  said device comprising an elongated bar common to the locks and mounted for rectilinear reciprocation along its longitudinal axis,
  said members comprising elongated links movable in parallelism with the path of travel of the bar,
  there being a row of studs rigidly mounted along the bar and the links,
  said bar being provided with elongated, longitudinal slots receiving the studs and having ends engageable with the studs, presenting said stop means for the bar,
  said links being provided with elongated, longitudinal slots receiving the studs and having ends engageable with the studs, presenting said stop means for the links.

7. In a vending machine having a plurality of vending assemblies, each controlling a vending operation, and each carrying a rectilinearly reciprocable lock, structure for precluding sequential operation of said assemblies, said structure comprising a reciprocable device having:
  releasable latch means normally limiting the extent of movement of the device in one direction;
  stop means normally holding the device against movement in the opposite direction;
  an element within the path of travel of and slidably engageable by each lock respectively for gradually and uniformly shifting the device in said one direction upon release of said latch means;
  blocking means for preventing movement of all remaining locks when one of the locks shifts the device in said one direction, each lock extending across the device beyond said element and being overlapped by said device when the latter is shifted thereby,
  each lock being adapted, prior to release of said latch means, to move the device to a limited extent in said one direction upon operation of the corresponding assembly; and
  a control responsive to said limited movement of the device for releasing the latch means.

8. The invention of claim 7,
said control having holding means for maintaining the latch means released during movement of said device to one end of its path of travel in said one direction; and
means responsive to movement of the device to said one end of its path of travel for releasing said holding means.

9. In a vending machine having a plurality of vending assemblies, each controlling a vending operation, and each carrying a rectilinearly reciprocable lock, structure for precluding sequential operation of said assemblies, said structure comprising a reciprocable device having:
  releasable latch means normally limiting the extent of movement of the device in one direction;

stop means normally holding the device against movement in the opposite direction;

an element within the path of travel of and slidably engageable by each lock respectively for gradually and uniformly shifting the device in said one direction upon release of said latch means;

blocking means for preventing movement of all remaining locks when one of the locks shifts the device in said one direction, each lock extending across the device beyond said element and being overlapped by said device when the latter is shifted thereby, each assembly being adapted for operation to a limited extent prior to release of said latch means; and a control response to said limited operation of at least one of said assemblies for releasing the latch means.

10. In a vending machine having a plurality of vending assemblies, each controlling a vending operation, and each carrying a movable part, releasable latch means normally limiting the extent of operation of said assemblies, each assembly being adapted for operation to a limited extent prior to release of said latch means, thereby imparting limited movement to said part thereof;

movable actuator means common to the assemblies;

a control responsive to movement of said actuator means in one direction for releasing said latching means; and shifter means responsive to said limited movement of at least certain of said parts for moving the actuator means in said one direction.

11. The invention of claim 10, said actuator means including an elongated, reciprocable component, said shifter means including a swingable unit operably coupled with each of said parts respectively, at least certain of said units being provided with cam means engageable with said component.

12. The invention of claim 11, said component having a series of spaced fingers, each cam means being rotatable into engagement with a corresponding finger.

13. The invention of claim 10, said actuator means including a number of reciprocable components, said shifter means including a swingable unit operably coupled with each of said parts respectively, certain of said units having cam means engageable with one of said components, certain other units having cam means engageable with another of said components.

14. The invention of claim 13, said cam means being displaceable on their units whereby to position the same for engagement with either of said components.

15. In a vending machine having a plurality of vending assemblies, each controlling a vending operation, and each having movable parts, releasable latch means normally limiting the extent of operation of said assemblies, each assembly being adapted for operation to a limited extent prior to release of said latch means, thereby imparting limited movement to said parts thereof, a plurality of switches, each controlling a different article price and disposed, when actuated, to release said latch means if the corresponding price has been deposited, a corresponding plurality of switch actuator means common to said assemblies and movable to operate respective switches by said limited movement of said parts, one of said switch actuator means always actuating one of said switches, irrespective of which vending assembly is operated, and means for presetting each vending assembly so that operation of a particular one thereof will cause any one or none of the remaining switches to be actuated.

16. The invention of claim 15, said always actuated switch corresponding to the highest of the pre-selected article prices, the other actuators associated with said remaining switches being provided with a series of fingers so spaced that one finger of each said other actuators is adjacent each vending assembly, and cam means on each vending assembly, pre-adjustable to engage the corresponding finger of any one of said other actuators to move the same as said movable parts are moved, whereby each vending assembly will release an article only for the highest article price unless said cam means is preset to engage one of the said other actuator means.

17. In a vending machine for cylindrical articles having a plurality of vending assemblies comprising, individually and in combination:

a station, having an opening, wherein the article to be vended is supported, a gate normally closing the opening, a first means for preventing opening of said gate until an amount has been deposited at least equivalent to article price, second means for preventing opening of said gate when the corresponding station is empty of an article, means for moving the article forwardly as said gate is opened for easy accessibility thereto, and means for pricing articles in different stations at different prices within a range thereof.

18. The invention of claim 7, and means responsive to the completion of each vending operation for presetting said control to require release of said latch means for each successive vending operation.

References Cited

UNITED STATES PATENTS

| | | | |
|---|---|---|---|
| 2,727,654 | 12/1955 | Childers et al. | 221—125 X |
| 3,115,274 | 12/1963 | Burton et al. | 221—125 |
| 3,262,603 | 7/1966 | Schendorf et al. | 221—18 |
| 3,349,961 | 10/1967 | Nathan et al. | 221—125 |
| 3,367,536 | 2/1968 | Fleagle | 221—125 X |

STANLEY H. TOLLBERG, Primary Examiner